United States Patent [19]

Haagen et al.

[11] Patent Number: 4,468,058
[45] Date of Patent: Aug. 28, 1984

[54] LOCKING FUEL CAP

[75] Inventors: Darl E. Haagen, Fremont, Ind.; David L. Eyre, Coldwater, Mich.

[73] Assignee: Kuhlman Corporation, Troy, Mich.

[21] Appl. No.: 479,663

[22] Filed: Mar. 28, 1983

Related U.S. Application Data

[63] Continuation of Ser. No. 255,233, Apr. 17, 1981, abandoned.

[51] Int. Cl.³ .............................................. E05B 47/00
[52] U.S. Cl. .................................................... 292/144
[58] Field of Search .................... 70/165, 90, 164, 50, 70/169; 220/210, 315; 292/153, 144

[56] References Cited

U.S. PATENT DOCUMENTS

| | | | |
|---|---|---|---|
| 1,072,593 | 9/1913 | Erz | 292/153 X |
| 1,624,840 | 4/1927 | Malluk | |
| 1,625,652 | 4/1927 | Groesbeck | |
| 1,788,473 | 1/1931 | Smith | |
| 1,824,352 | 9/1931 | Isaacs | |
| 1,867,919 | 7/1932 | Lowther | |
| 1,880,135 | 9/1932 | Heath | |
| 1,918,093 | 7/1933 | Gang | |
| 1,932,957 | 10/1933 | Cullinan | 70/90 |
| 2,019,393 | 10/1935 | Carah | 177/314 |
| 2,028,515 | 1/1936 | McClanahan | 123/146.5 |
| 2,041,387 | 5/1936 | Adams | 70/50 |
| 2,146,968 | 2/1939 | Macagno | 292/144 |
| 2,148,338 | 2/1939 | Croston et al. | 292/144 |
| 2,205,712 | 6/1940 | Bitgood | 292/144 |
| 2,927,811 | 3/1960 | Rea et al. | 292/144 X |
| 3,901,407 | 8/1975 | Mitchell et al. | 220/315 |
| 3,907,155 | 9/1975 | Smith et al. | 220/210 |
| 4,000,632 | 1/1977 | Summon | 70/165 |
| 4,000,633 | 1/1977 | Evans | 70/165 |
| 4,030,322 | 6/1977 | Pettit | 292/144 X |
| 4,107,961 | 8/1978 | Evans | 70/165 |
| 4,132,091 | 1/1979 | Aro et al. | 70/165 |
| 4,171,630 | 10/1979 | Fernandez | 70/164 |

FOREIGN PATENT DOCUMENTS

| | | | |
|---|---|---|---|
| 1190429 | 10/1959 | France | 70/169 |
| 269119 | 2/1949 | Switzerland | 70/169 |

Primary Examiner—Richard E. Moore
Attorney, Agent, or Firm—Harness, Dickey & Pierce

[57] ABSTRACT

A locking fuel cap arrangement for preventing unauthorized access to the fuel tank of a vehicle. The filler cap is provided with a plurality of ratchet teeth formed on the underside thereof. A spring-biased electrical solenoid operates a pawl that is adapted to engage the ratchet teeth and prevent removal of the filler cap and to disengage the ratchet teeth when the solenoid is energized. A lock-out pin automatically assumes an interference position when the solenoid is energized to prevent re-engagement of the pawl and ratchet teeth after the solenoid is de-energized, thereby permitting removal of the filler cap. Upon subsequent re-installation of the filler cap after removal, the lock-out pin is automatically rotated into a non-interfering position by the clockwise rotation of the filler cap as it is threaded onto the filler neck, thus permitting the pawl to re-engage the ratchet teeth in the filler cap.

10 Claims, 6 Drawing Figures

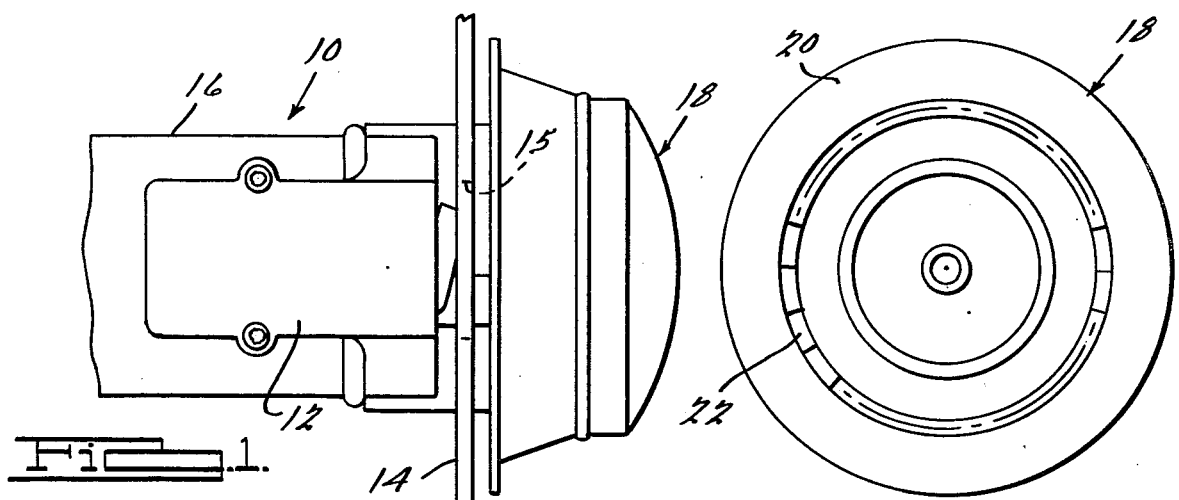
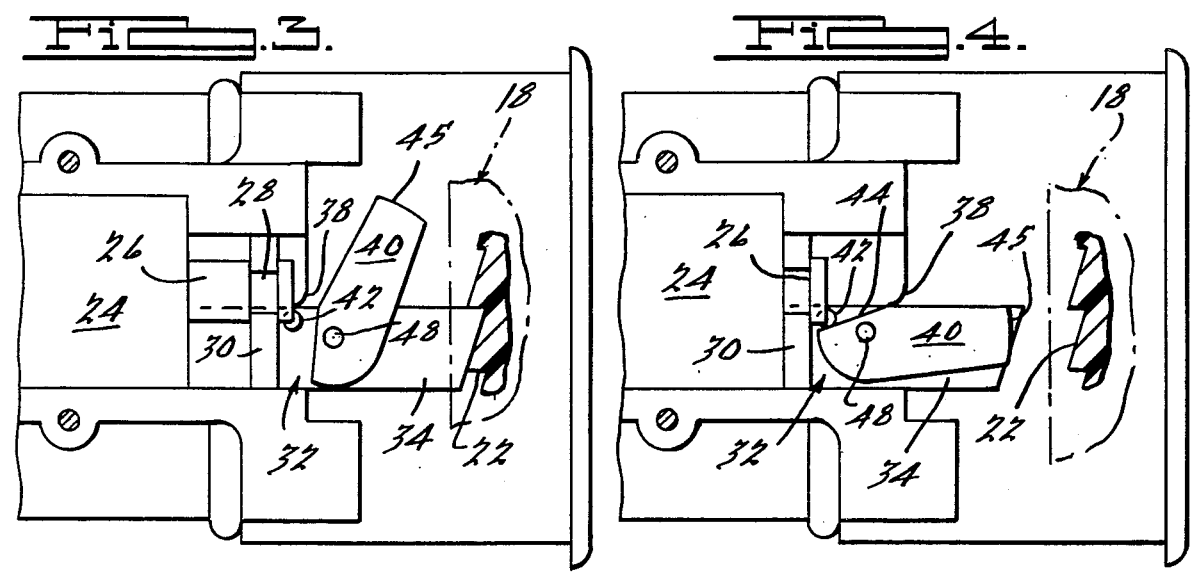
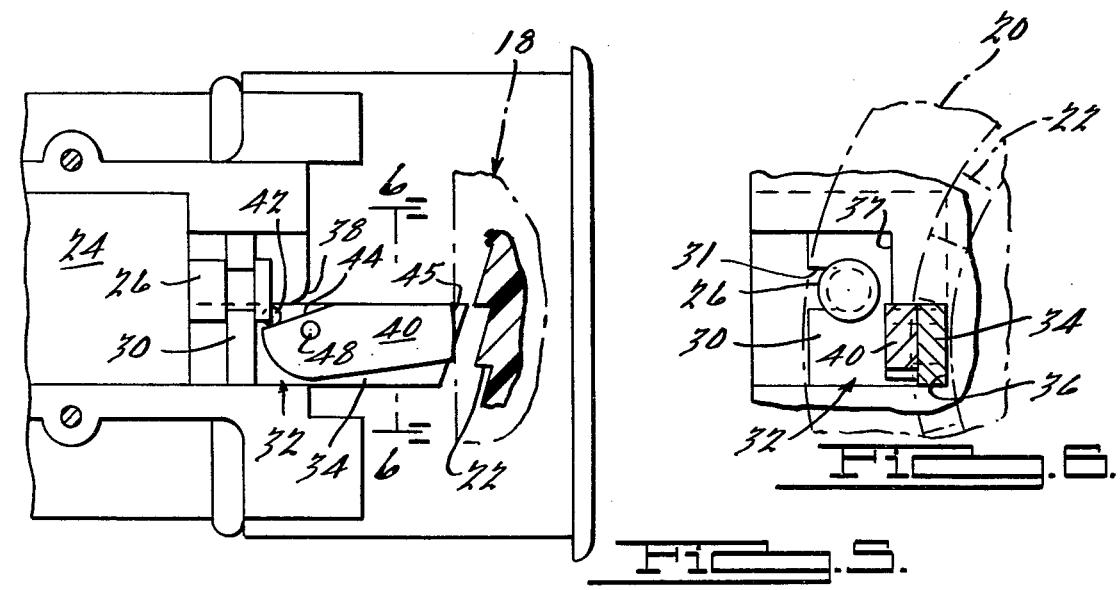
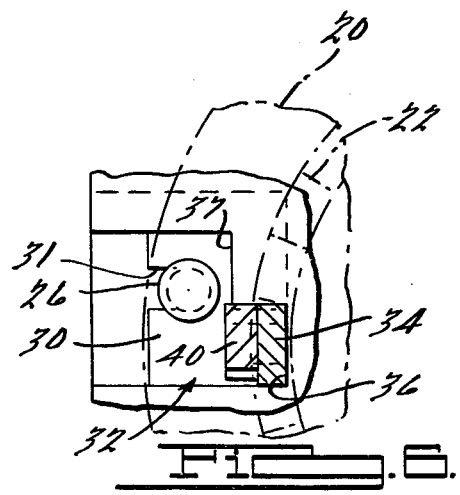

LOCKING FUEL CAP

This is a continuation of application Ser. No. 255,233, filed Apr. 17, 1981, now abandoned.

BACKGROUND AND SUMMARY OF THE INVENTION

The present invention relates to a locking filler cap mechanism that is particularly adapted for use on automobiles to prevent unauthorized access to the fuel tank of an automobile.

With the ever increasing cost of fuel, it is becoming increasingly desirable to equip an automobile with means for preventing unauthorized access to the fuel tank of the automobile. However, it is equally desirable that the means provided do not present a significant inconvenience to the owner of the vehicle.

It is the principle object of the present invention, therefore, to provide an improved fuel cap locking mechanism which functions reliably and yet is relatively simple and inexpensive to manufacture and convenient to use.

In general, the filler cap in the present invention is provided with an annular ring of ratchet teeth formed on the underside of the cap. Mounted to the filler neck adjacent the opening is a housing containing an electrical solenoid having a spring-loaded armature pin. The armature pin is mechanically coupled to a locking pawl which projects outwardly from the housing and engages the ratchet teeth in the bottom of the filler cap when the cap is fastened over the filler neck opening. Pivotally connected to the locking pawl is a lock-out pin which when pivoted into alignment with the locking pawl, projects outwardly from the housing approximately the same distance as the locking pawl.

When the filler cap is installed on the end of the filler neck and the pawl is engaged with the ratchet teeth of the cap, the lock-out pin is non-aligned with the pawl. However, when the solenoid is activated, preferably by a remotely located switch in the dashboard area of the vehicle, the armature pin is drawn into the solenoid, thereby retracting the pawl and disengaging it from the ratchet teeth in the filler cap. Simultaneously as the armature pin and pawl are retracted, the lock-out pin is rotated into alignment with the pawl by virtue of a cam surface formed in the housing wall. When the solenoid is de-energized after momentary activation of the remote switch, the spring-loaded armature pin urges the pawl and lock-out pin assembly outwardly from the housing. However, the pawl is prevented from re-engaging the ratchet teeth in the filler cap by virtue of the lock-out pin which, now aligned with the pawl, contacts the bottom surface of the filler cap and impedes further return movement of the pawl. Consequently, the filler cap can now be removed. In addition, when the filler cap is re-installed onto the filler neck after removal, the rotation of the filler cap causes the lock-out pin to be pivoted into its non-aligned position when contacted by the bottom surface of the filler cap, thereby permitting the pawl to automatically re-engage the ratchet teeth in the filler cap. Thus, it will be appreciated that with the locking arrangement of the present invention, the filler cap can be removed upon a single momentary activation of a remotely located switch and also, upon subsequent re-installation of the filler cap, is automatically locked to prevent unauthorized removal of the filler cap.

Additional objects and advantages of the present invention will become apparent from a reading of the detailed description of the preferred embodiment which makes reference to the following set of drawings in which:

BRIEF DESCRIPTION OF THE DRAWINGS

FIG. 1 is a side elevational view of a locking fuel cap mechanism according to the present invention;

FIG. 2 is a plan view of the underside of the filler cap of the present invention;

FIG. 3 is an exposed side elevational view of the locking mechanism according to the present invention, with the locking mechanism in the latched position;

FIG. 4 is another side elevational view illustrating the locking mechanism in the unlatched position;

FIG. 5 is another side elevational view of the locking mechanism with the locking mechanism in the lock-out position; and FIG. 6 is an enlarged sectional view of the locking mechanism shown in FIG. 5 taken along line 6—6.

DETAILED DESCRIPTION OF THE PREFERRED EMBODIMENT

Referring to the drawings, a locking fuel cap mechanism 10 according to the present invention is shown. The underside of the filler cap 18, as illustrated in FIG. 2, is provided with a plurality of ratchet teeth 22 formed in an annular ring that is recessed relative to the bottom surface of the outer flange portion 20 of the filler cap 18. The locking mechanism is contained within a housing 12 which is secured to a collar 14 located adjacent the open end of the filler neck 16 of the fuel tank. The collar 14 is spaced from the end of the filler neck 16 a sufficient distance to permit the filler cap 18 to be threadedly engaged onto the end of the filler neck 16, as shown in FIG. 1. The collar 14 has an aperture 15 formed therein to permit the latching mechanism to project therethrough into the underside of the filler cap 18, as will subsequently be described.

It will be noted at this point that while the preferred embodiment illustrates a filler cap that threadedly engages onto the filler neck over several full turns, the present invention is equally applicable to a cam lock-type filler cap which is rotated less than a full revolution onto the filler neck during installation. Furthermore, it is to be understood that references in the claims to the filler cap being "threadedly engaged" onto the filler neck are expressly intended to encompass such alternative arrangement.

Contained within the housing 12 is an electrical solenoid 24 having associated therewith a spring-loaded armature 26 with a reduced diameter portion 28. The particular solenoid utilized in the preferred embodiment is an encapsulated D-frame type solenoid which exhibits approximately a 5 lb. pull force. The armature 26 controls the movement of a locking pawl 32 comprised of a stem portion 34 which extends outwardly from housing 12 and an integral base portion 30 having a slot 31 (FIG. 6) formed therein for coupling to the reduced diameter portion 28 of the armature 26. When the filler cap 18 is properly installed onto the end of filler neck 16 and the solenoid 24 is not energized, the armature 26 protrudes from the solenoid under the bias force of an internal spring (not shown) and the locking pawl 32 engages the ratchet teeth 22 of the filler cap 18, as shown in FIG. 3.

With particular reference to FIG. 6, the stem portion 34 of pawl 32 is offset relative to base portion 30 so that the stem will be properly aligned with the ratchet teeth 22 when the filler cap 18 is installed. The offset stem portion 34 of pawl 32 is located within a channel 36 formed in the rear wall 37 of the housing 12. The upper edge of the channel wall is preferably rounded to form a cam surface 38, as shown in FIGS. 3-5.

Pivotally connected to the stem portion 34 of the locking pawl 32 is a lock-out pin 40 which is adapted to pivot about pin 48 between a first position illustrated in FIG. 3 and a second position aligned with the stem portion 34 of locking pawl 32 illustrated in FIGS. 4 and 5. A stop 42 located on the side of locking pawl 32 is adapted to cooperate with edge surface 44 of lock-out pin 40 to positively locate the lock-out pin in the aligned position. The outer end surface 45 of lock-out pin 40 is also preferably rounded as shown, and when aligned with the stem 34 of pawl 32 is slightly shorter in length.

The locking mechanism of the present invention functions in the following manner. Initially, the filler cap 18 is installed on the end of filler neck 16 and the ratchet teeth 22 formed on under side of the cap 18 are engaged to the locking pawl 32 to thereby prevent removal by rotation of the filler cap 18 in the counterclockwise direction. When the solenoid 24 is energized, preferably by a remotely located switch in the dashboard area of the vehicle, the armature 26 is drawn into the solenoid 24, thereby retracting the locking pawl 32 and disengaging it from the ratchet teeth 22 in the filler cap 18. Simultaneously, as the locking paw 32 is retracted into the housing 12, the edge of lock-out pin 40 contacts cam surface 38, thereby pivoting lock-out pin 40 into alignment with the stem 34 of locking pawl 32, as shown in FIG. 4. After momentary activation of the remote switch, the solenoid 24 is de-energized and the internal spring within the solenoid urges the armature 26 outwardly toward its initial extended position. However, due to the fact that lock-out pin 40 is now aligned with the stem 34 of pawl 32, the outer edge surface 45 of the pin 40 contacts the bottom surface of the outer flange 20 of the filler cap 18, thus preventing the armature from fully extending from the solenoid 24 and the locking pawl 32 from re-engaging ratchet teeth 22, as illustrated in FIG. 5. Accordingly, it will be appreciated that the filler cap 18 can now be rotated in the counterclockwise direction to remove it from the filler neck 16.

Upon subsequent re-installation of the filler cap 18 onto the filler neck 16, the bottom surface 20 of the filler cap will contact the end surface 45 of lock-out pin 40 and cause it to pivot to the non-aligned position shown in FIG. 3 as the filler cap 18 is rotated in the clockwise direction. This, in turn, permits the armature 26 to return the locking pawl 32 to its fully extended position into engagement with the ratchet teeth 22 of the filler cap 18. Thus, it will be appreciated that the filler cap 18 is automatically unlatched and hence removable upon a single momentary activation of a remotely located switch. In addition, the filler cap 18 is automatically re-latched upon subsequent re-installation of the filler cap into the filler neck 16.

While the above description constitutes the preferred embodiment of the present invention, it will be appreciated that the invention is susceptible to modification, variation and change without departing from the proper scope or fair meaning of the accompanying claims.

What is claimed is:

1. A fuel cap locking device for a vehicle having a fuel tank and a filler neck associated therewith for adding fuel to said tank, comprising:

a filler cap for threadedly engaging onto the open end of the filler neck of the fuel tank and having a plurality of ratchet teeth formed on the underside thereof in an annular ring recessed relative to the bottom surface of the filler cap;

an electrical solenoid disposed adjacent the end of said filler neck and having a spring-biased armature which projects outwardly from the solenoid when the solenoid is not energized and is retracted into the solenoid when the solenoid is energized;

a pawl for engaging said ratchet teeth to prevent rotation of said filler cap in a counterclockwise direction, said pawl being connected to said armature for movement therewith such that when said solenoid is energized the pawl is withdrawn and disengaged from the ratchet teeth of said filler cap;

a lock-out pin pivotally connected to said pawl for pivotal rotation clockwise from a first position aligned with said pawl to a second non-aligned position and vice versa, said lock-out pin being of sufficient length to contact said bottom surface of said filler cap and prevent said pawl from engaging said ratchet teeth when the lock-out pin is aligned with said pawl and said filler cap is installed on said filler neck, and said lock-out pin being pivotable to said second non-aligned position by said bottom surface when said filler cap is rotated clockwise as it is re-installed onto the filler neck; and cam means for rotating said lock-out pin from said second non-aligned position to said first aligned position when said solenoid is energized and said pawl is withdrawn as said armature is retracted into said solenoid.

2. The apparatus of claim 1 further including stop means for positively locating said lock-out pin in said first aligned position.

3. The apparatus of claim 1 wherein the end surface of said lock-out pin which contacts said bottom surface of said filler cap is curved.

4. A fuel cap locking device for a vehicle having a fuel tank and a filler neck associated therewith for adding fuel to said tank, comprising:

a filler cap for threadedly engaging onto the open end of the filler neck of the fuel tank and having a plurality of ratchet teeth formed on the underside thereof;

locking means including an electrical solenoid and a pawl for engaging said ratchet teeth to prevent removal of said filler cap and for disengaging from said ratchet teeth when said solenoid is energized; and lock-out means for automatically assuming an operative position in response to the energization of said solenoid to prevent said pawl from re-engaging said ratchet teeth when said solenoid is de-energized and for automatically assuming an inoperative position when said filler cap is re-installed onto the filler neck after removal therefrom to permit said pawl to re-engage said ratchet teeth.

5. The apparatus of claim 4 wherein said locking means further includes a spring-biased armature that is adapted to project from said solenoid when not energized and to retract into the solenoid when energized.

6. The apparatus of claim 5 wherein said pawl is mechanically coupled to said armature for movement therewith.

7. The apparatus of claim 6 wherein said lock-out means includes a pin pivotally connected to said pawl for pivotal rotation between said operative and inoperative positions.

8. The apparatus of claim 7 wherein said lock-out means forther includes means for causing said pin to rotate to said operative position when said pawl is withdrawn from engagement with said ratchet teeth by the energization of said solenoid.

9. The apparatus of claim 8 wherein upon de-energization of said solenoid after energization thereof said pin in said operative position contacts the underside of said filler cap and thereby prevents said pawl from engaging said ratchet teeth.

10. The apparatus of claim 9 wherein said pin is adapted to be rotated from said operative position to said inoperative position when said filler cap is reinstalled onto the filler neck after removal therefrom and the underside of said filler cap contacts said pin as said filler cap is threaded onto said filler neck.

* * * * *